Figure 1:
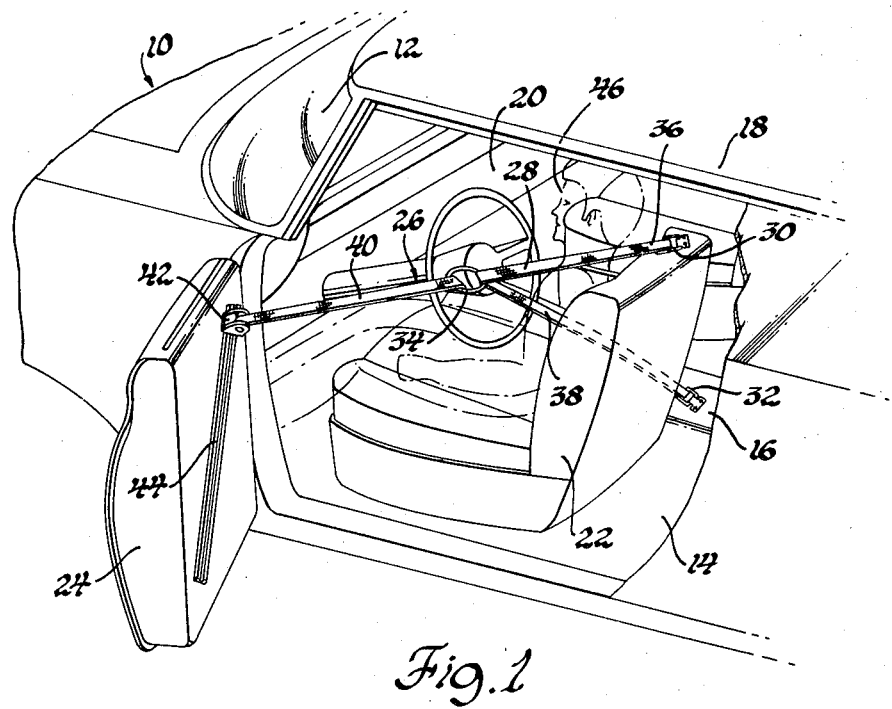

United States Patent
Weststrate

[15] 3,684,310
[45] Aug. 15, 1972

[54] VEHICLE PASSIVE OCCUPANT RESTRAINING BELT ARRANGEMENT

[72] Inventor: Willem J. J. Weststrate, Washington, Mich.

[73] Assignee: General Motors Corporation, Detroit, Mich.

[22] Filed: Feb. 25, 1971

[21] Appl. No.: 118,606

[52] U.S. Cl. .......................................... 280/150 SB
[51] Int. Cl. .............................................. B60r 21/02
[58] Field of Search ............................... 280/150 SB

[56] References Cited

UNITED STATES PATENTS 3,583,726   6/1971   Lindblad .............. 280/150 SB
3,415,538   12/1968   Radke .................. 280/150 SB

*Primary Examiner*—Benjamin Hersh
*Assistant Examiner*—Robert R. Song
*Attorney*—W. E. Finken and Herbert Furman

[57] ABSTRACT

A vehicle passive occupant restraining belt arrangement includes a first belt having one end fixed to an upper inboard portion of a vehicle seat and the other end fixed adjacent a lower inboard portion of the seat, a ring member slidably receiving an intermediate portion of the first belt to define shoulder and lap belt portions, a second belt having one end attached to the ring member and the other end received by an inertia retractor slidably mounted on the vehicle body door for movement between an upper forward position and a lower rearward position, and a conventional drive mechanism for moving the retractor to the upper forward position and the belt arrangement to an easy-enter position during door opening movement and moving the retractor to the lower rearward position and the belt arrangement to an occupant restraining position during door closing movement.

1 Claim, 2 Drawing Figures

PATENTED AUG 15 1972　　　　　　　　　　　　　　3,684,310

INVENTOR.
Willem J.J. Weststrate
BY
Herbert Furman
ATTORNEY

VEHICLE PASSIVE OCCUPANT RESTRAINING BELT ARRANGEMENT

This invention relates to a vehicle passive occupant restraining belt arrangement and more particularly to such an arrangement in which an inertia retractor is slidably mounted on a vehicle body door and is moved to an upper forward position during door opening movement and to a lower rearward position during door closing movement to move the belt arrangement between easy-enter and occupant restraining positions.

It is known to provide a vehicle passive occupant restraining belt arrangement in which a belt has one end fixed to a carrier slidably mounted on a vehicle door for movement between an upper forward position and a lower rearward position to move the belt arrangement between easy-enter and occupant restraining positions. It is also known to provide a vehicle passive occupant restraining belt arrangement in which a belt is received by a belt retractor mounted on a vehicle door.

This invention provides a vehicle passive occupant restraining belt arrangement in which an inertia retractor is slidably mounted on a vehicle body door and connected to lap and shoulder belt portions such that movement of the retractor to an upper forward position during door opening movement moves the shoulder and lap belt portions to easy-enter positions and movement of the retractor to a lower rearward position during door closing movement moves the shoulder and lap belt portions to occupant restraining positions.

Accordingly, an object of this invention is to provide a vehicle passive occupant restraining belt arrangement in which shoulder and lap belt portions are moved between easy-enter and occupant restraining positions by the sliding movement of an inertia retractor between an upper forward position and a lower rearward position in response to door movement.

Figure 2:
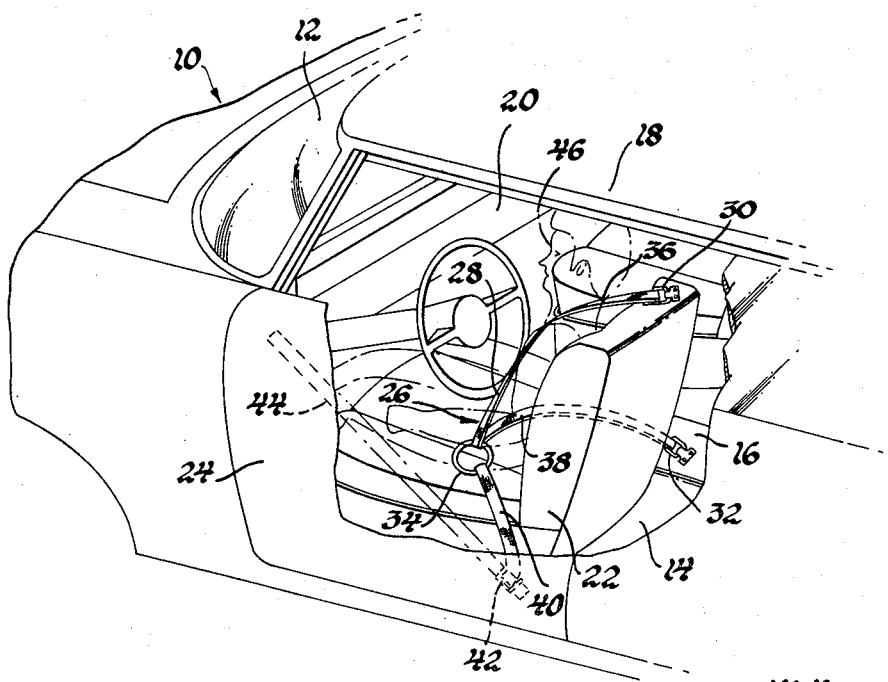

This object and other objects of this invention will be readily apparent from the following detailed description and drawing in which:

FIG. 1 is a view of a portion of a vehicle body whose door is shown in open position and which includes a passive occupant restraining belt arrangement according to the invention shown in an easy-enter position; and FIG. 2 is a partially broken away perspective view of the portion of the vehicle body with the door in closed position and with the belt arrangement in an occupant restraining position.

Referring now to the drawing, a vehicle body generally indicated by 10 includes a windshield 12, a floor 14 with a conventional transmission tunnel 16, and a roof 18 that cooperate to define an occupant compartment 20. A conventional vehicle seat 22 is mounted within the occupant compartment 20 in the usual manner and is accessible through a vehicle body door opening selectively opened and closed by a vehicle body door 24 whose front edge is pivotally mounted to the body 10 in the conventional manner.

A passive occupant restraining belt arrangement according to the invention is generally indicated by 26 and includes a first belt 28 having one end fixed to an upper inboard portion of the back of seat 22 by an attachment 30 and having the other end secured to the transmission tunnel 16, generally below the one end, by an attachment 32. A ring member 34 slidably receives an intermediate portion of belt 28 to define shoulder and lap belt portions 36 and 38, respectively. A second belt 40 has one end secured to ring member 34 with the other end received by a conventional inertia retractor 42. Inertia retractor 42 is slidably mounted on door 24 by a track member 44 whose front end is tipped upwardly and whose rear end terminates generally adjacent the lower rear portion of door 24. Inertia retractor 42 is moved along track member 44 by a conventional drive mechanism, not shown, in response to door opening and closing movement. This drive mechanism may include a body mounted arcuate gear rack engageable with a rotatable pinion mounted on the door 24 that drives the retractor through a suitable conventional gear train or the like. It is also possible for the drive mechanism to include a connection to the conventional power window regulator motor that is actuated through a suitable circuit to provide for the movement of the inertia retractor 42; this circuit may or may not include the conventional door jamb switch.

When the door 24 is in closed position as in FIG. 2, the drive mechanism positions the retractor 42 in a lower rearward position adjacent the lower rear portion of seat 22 and the normal retraction of belt 40 by retractor 42 positions the ring member 34 in a lower rearward position thus maintaining the shoulder and lap belt portions 36 and 38 across the chest and lap of a phantom line indicated seated occupant 46. During door opening movement, the drive mechanism moves the retractor 42 from the lower rearward position along track member 44 to an upper forward position, FIG. 1, as the inertia retractor 42 protracts belt 40, of course, at a rate lower than that which will lock the retractor. When the door is in open position and the inertia retractor 42 is in the upper forward position, the normal retraction of belt 40 positions ring member 34 in an upper forward position thus positioning the shoulder and lap belt portions 36 and 38 in easy-enter positions allowing convenient occupant egress from the vehicle body 10.

When an occupant enters the vehicle body 10 and closes the door 24, the retractor 42 is moved by the drive mechanism from the upper forward position to the lower rearward position thus moving the ring member 34 to the FIG. 2 lower rearward position and the shoulder and lap belt portions 36 and 38 to the occupant restraining positions previously described.

The invention thus provides a vehicle passive occupant restraining belt arrangement in which an inertia retractor is slidably mounted on a vehicle body door and moved between an upper forward position and a lower rearward position in response to door movement to move the belt arrangement between easy-enter and occupant restraining positions.

What is claimed is:

1. In combination with a vehicle body including a floor and a roof defining an occupant compartment in which is mounted a vehicle seat accessible through a vehicle body door opening selectively opened and closed by a vehicle body door whose front edge is pivotally secured to the vehicle body, a passive occupant restraining belt arrangement comprising, a first belt having one end fixed to an upper inboard portion of the seat and the other end fixed adjacent a lower inboard portion of the seat generally below the one end, an apertured member slidably receiving an intermediate portion of the first belt to define shoulder and lap belt portions, a second belt having one end secured to the apertured member, an inertia retractor receiving the other end of the second belt, elongated slide means mounted on the door in an angular position with the front end above the rear end and supporting the retractor for longitudinal sliding movement with respect thereto between a lower rearward position and an upper forward position, and drive means for moving the retractor to the upper forward position during door opening movement to move the apertured member to an upper forward position and the shoulder and lap belt portions to easy-enter positions, the drive means moving the retractor to the lower rearward position during door closing movement to move the apertured member to a lower rearward position and the shoulder and lap belt portions to occupant restraining positions across the chest and lap of a seated occupant.

* * * * *